United States Patent [19]

Matsuo et al.

[11] Patent Number: 4,962,736
[45] Date of Patent: Oct. 16, 1990

[54] DIESEL ENGINE

[75] Inventors: Noritaka Matsuo; Jun Taue; Kazuo Miyazawa, all of Iwata, Japan

[73] Assignee: Yamaha Hatsudoki Kabushiki Kaisha, Hamamatsu, Japan

[21] Appl. No.: 360,396

[22] Filed: Jun. 1, 1989

[30] Foreign Application Priority Data

Jun. 2, 1988 [JP] Japan .................................. 63-134462

[51] Int. Cl.$^5$ ........................ F02B 19/14; F02B 19/08
[52] U.S. Cl. .................................... 123/257; 123/269; 123/275; 123/289
[58] Field of Search ................ 123/257, 261, 268, 269, 123/275, 286, 289

[56] References Cited

U.S. PATENT DOCUMENTS

| Re. 18,429 | 4/1932 | Peterson | 123/289 |
|---|---|---|---|
| 3,044,455 | 7/1962 | Papa et al. | 123/257 |
| 3,583,372 | 6/1971 | Hoffmann | 123/269 X |
| 4,483,289 | 11/1984 | Paul et al. | 123/289 X |
| 4,483,290 | 11/1984 | Hass | 123/275 X |
| 4,545,344 | 10/1985 | Matuo | 123/286 |
| 4,774,919 | 10/1988 | Matsuo et al. | 123/257 |

Primary Examiner—Willis R. Wolfe
Attorney, Agent, or Firm—Ernest A. Beutler

[57] ABSTRACT

A combustion chamber and method of operating a diesel engine to insure maximum air utilization. The engine has a main chamber and a subchamber that communicates with the main chamber through a communication passageway. Fuel injection into the subchamber is begun at a time when the throat area of the engine by which the main chamber communicates with the communication passageway is equivalent to approximately the effective flow area of the communication passageway so as to insure maximum air utilization.

14 Claims, 3 Drawing Sheets

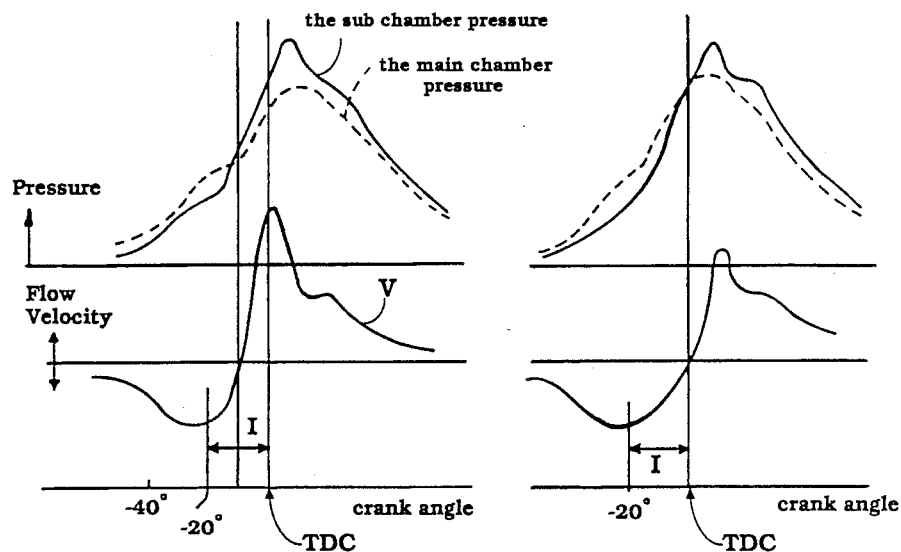
Figure 1
Prior Art
Figure 2
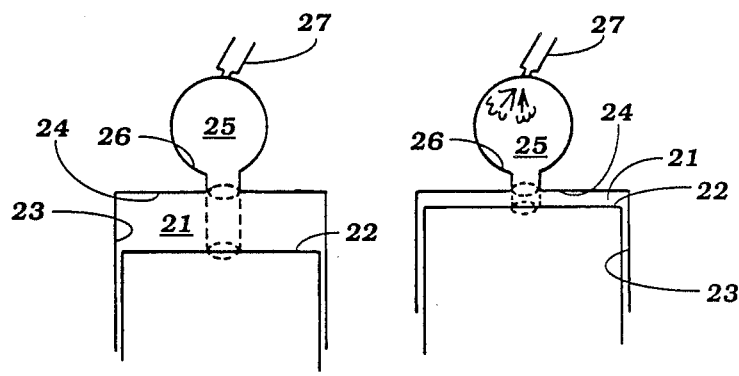
Figure 3
Figure 5
Figure 4
Figure 6

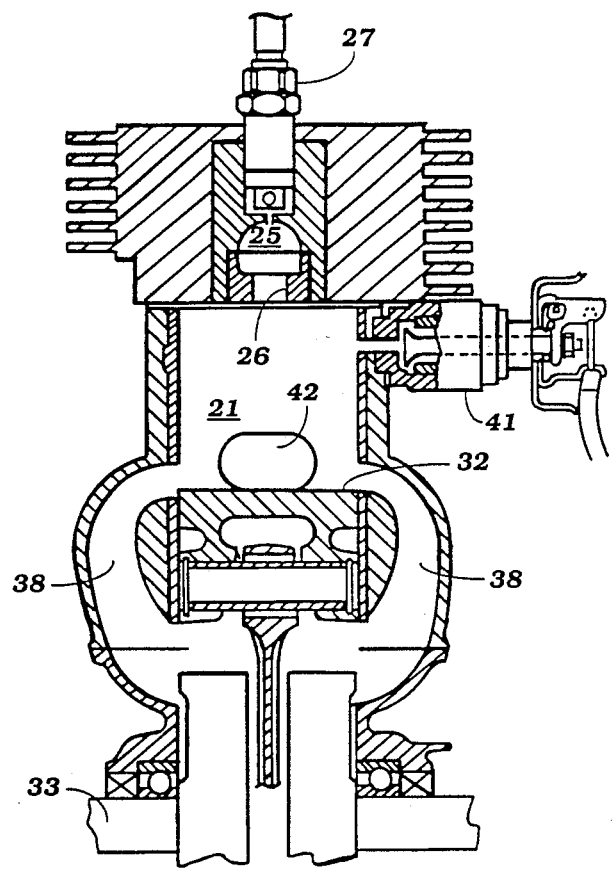
*Figure 8*
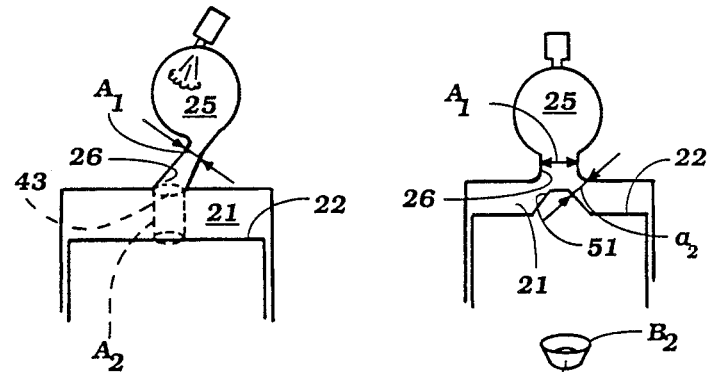
*Figure 9*  *Figure 10*

DIESEL ENGINE

BACKGROUND OF THE INVENTION

This invention relates to a diesel engine and more particularly to an improved combustion chamber configuration for a diesel engine and a method of operating a diesel engine.

One popular form of diesel combustion chamber employes a subchamber that communicates with the main chamber through a restricted passageway and into which the fuel is injected to initiate combustion. As the fuel combusts in the subchamber, it expands and exits into the main chamber through this communicating passageway. The communicating passageway and the subchamber are configured in such a way so as to generate turbulence which is intended to insure complete combustion. Generally, the fuel is injected into the subchamber at a time when there is a high velocity of flow into the subchamber from the main chamber through the communicating passageway so that this turbulence will further aid in the combustion. Although this type of combustion chamber has considerable advantages, it has been found that it is difficult to insure that there is maximum air utilization. Heretofore, it has been generally the practice to rely upon the skill of the designer to select the desired relationship in order to obtain maximum air utilization.

It is, therefore, a principal object of this invention to provide an improved combustion air configuration for a diesel engine that will maximize air utilization.

It is a further object of this invention to provide a method of operating a diesel engine and an associated combustion chamber therefor that will maximize air utilization and performance.

SUMMARY OF THE INVENTION

This invention is adapted to be embodied in a diesel engine that comprises means which define a main chamber that varies cyclically in volume during the engine operation and which forms a main combustion chamber. The engine is also provided with a subchamber that has a volume substantially smaller than the maximum volume of the main chamber and which communicates with the main chamber through a communication passageway. The varying volume of the main chamber at times effects a flow through the communication passageway from the main chamber into the subchamber through a throat area that varies in size during the cyclic operation of the engine. Fuel injection means are provided for injecting fuel into the subchamber to initiate and maintain combustion. In accordance with the invention, means are provided for effecting the beginning of fuel injection from the fuel injection means at the time when the effective area of the throat area decreases to an area that is substantially equal to the effective flow area of the communication passageway.

Another feature of the invention is adapted to be embodied in the method for operating a diesel engine having a main chamber, a subchamber and a communicating passageway as aforedescribed. In accordance with this feature of the invention, the beginning of fuel injection is initiated at the time when the effective throat area is substantially equal to the effective flow area of the communication passageway.

BRIEF DESCRIPTION OF THE DRAWINGS

FIG. 1 is a graphical view showing the pressure in the main and subchambers and the flow velocity between these two chambers in relation to crank angle in a conventional prior art engine.

FIG. 2 is a graphical view showing the pressure and velocity characteristics in relation to crank angle of an engine constructed in accordance with an embodiment of the invention.

FIG. 3 is a partially schematic view showing the relationship between the main and subchambers of an engine operating on the principles of the invention during the compression stroke.

FIG. 4 is a schematic view showing the effective throat area for flow from the main chamber to the subchamber under the conditions shown in FIG. 3.

FIG. 5 is a schematic view, in part similar to FIG. 3, showing the arrangement at the time when fuel injection is begun.

FIG. 6 is a view, in part similar to FIG. 4, showing the effective throat area under the condition shown in FIG. 5.

FIG. 8 is a cross-sectional view of the engine taken along a plane perpendicular to the plane of FIG. 7.

FIG. 9 is a partially schematic view, similar to FIGS. 3 and 5, showing another embodiment of the invention.

FIG. 10 is a schematic view, in part similar to FIGS. 3, 5 and 9, showing a still further embodiment of the invention.

DETAILED DESCRIPTION OF THE PREFERRED EMBODIMENTS

Figure 7:
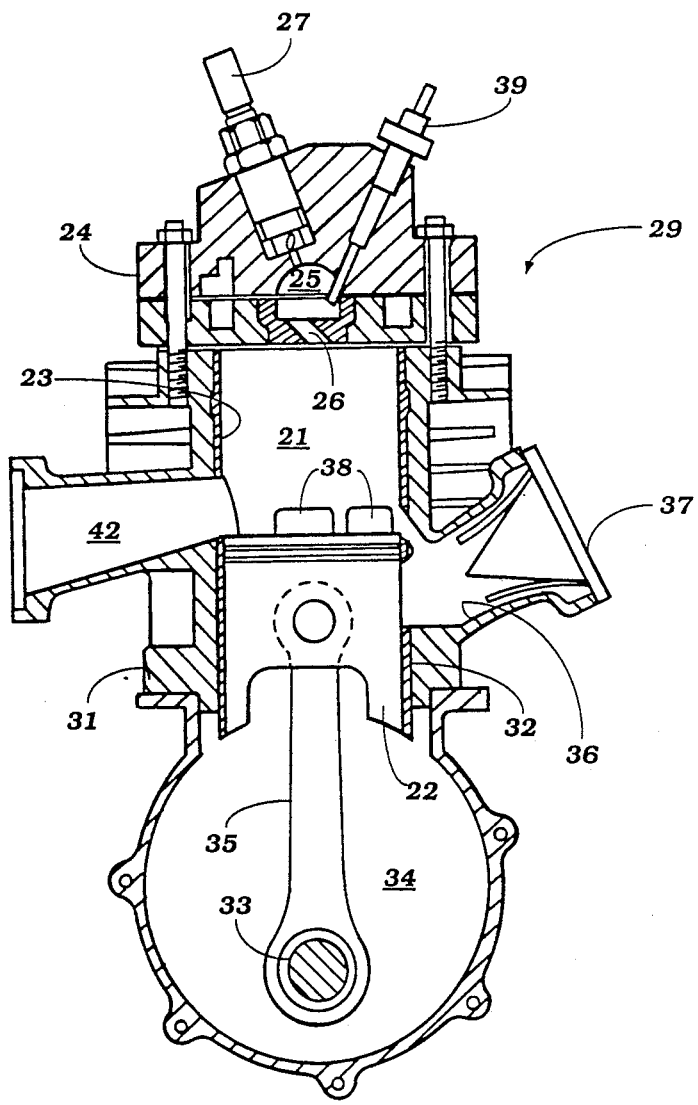
FIG. 7 is a cross-sectional view of a diesel engine constructed in accordance with an embodiment of the invention.

The operation of a conventional prior art engine having a main chamber and a subchamber communicating with the main chamber through a communicating passageway can be best understood by reference to FIG. 1 wherein crankshaft angle is shown on the ordinate and flow velocity between the two chambers and pressure are shown on the abscissa. It should be noted that with a conventional engine of this type, fuel injection is begun into the subchamber at a time before top dead center condition and the beginning of fuel injection causes the beginning of combustion. This is because of the high pressure and turbulence which exists in the subchamber, wherein the fuel is injected, at the time of injection.

Normally the beginning of injection occurs at some time beginning at approximately 20° before top dead center and continues up until top dead center condition or slightly afterwards. The actual time of beginning of injection depends upon load and at high loads, the injection begins at approximately 20° before top dead center.

As may be seen from the pressure traces on FIG. 1, during the initial upward movement of the piston, the pressure in the main chamber is higher than the pressure in the subchamber and this causes a flow to occur from the main chamber to the subchamber through the communicating passageway. The velocity of flow is shown on the lower curve and is in a negative sense since the flow is occurring from the main chamber to the subchamber.

When the fuel injection begins, combustion will occur in the subchamber very shortly thereafter and as may be seen from the pressure trace, the pressure rapidly rises in the subchamber and at some point thereafter, such as 10° before top dead center, the pressure in the subchamber will exceed the pressure in the main chamber. When this occurs, of course, the flow from the main chamber to the subchamber will discontinue and no further air from the main chamber will be able to enter the subchamber. As a result, there is not good air utilization and the performance of the engine will be deteriorated from the ideal possible.

In accordance with the invention, a pressure flow velocity curve as shown in FIG. 2 results due to the construction of the engine and its method of operation. This is achieved by deferring the time of fuel injection until the effective throat area, as to be defined, between the main chamber and the communication passageway decreases to approximately the effective flow area of the communication passageway so that the geometry of the system would be such that there would be no further flow from the main chamber to the subchamber. As a result, and as may be seen in FIG. 2, the flow from the main chamber to the subchamber continues all the way up until the piston reaches top dead center before the flow occurs in the opposite direction. As a result maximum air utilization is obtained.

The general principle of the invention will not be described by particular reference to FIGS. 3 through 6 wherein an engine is depicted schematically and includes a main chamber 21 that is defined by a piston 22 that reciprocates in a cylinder bore 23 that is closed at its upper end by a cylinder head 24. A subchamber 25 is formed in the cylinder head 24 and communicates with the main chamber 21 through a communicating passageway 26. A fuel injection nozzle 27 is supported in the cylinder head 24 and discharges into the subchamber 25.

The engine operates on the two-stroke, crankcase compression principle, however, it is to be understood that certain of the principles of the invention may be employed with four-stroke cycle engines. However, the invention has particular utility in connection with two-cycle engines.

As the piston 22 travels upwardly in the cylinder bore 21, and the pressure in the main chamber 21 rises above the pressure in the subchamber 25, there will be a flow from the main chamber to the subchamber through the communicating passageway 26. This flow exist from the main chamber 23 through a throat area $A_2$ which in the illustrated embodiment comprises a generally cylindrical area 28 (FIG. 4) with the effective area gradually diminishing as the piston 22 travels upwardly toward its top dead center position. The effective flow area of the communicating passageway 26 is designated at $A_1$ and this area is generally the minimum cross-sectional area of the communicating passageway 26.

As the piston 22 continues its upward stroke, there will eventually occur a time when the area $A_2$ of the throat equals the area $A_1$ of the communication passageway (FIGS. 5 and 6) and at this time fuel injection is begun by beginning the discharge of the nozzle 27. At this particular point in time, the pressure conditions will be such that there would normally be no further significant flow from the main chamber 21 into the subchamber 25 due to the restriction of the throat area $A_2$. In a preferred form, the area $A_2$ at top dead center is larger than 0.5% of the piston area to avoid throttling losses.

By injecting the fuel at no earlier than this time, the curves as shown in FIG. 2 can be achieved and maximum air utilization will be obtained.

FIGS. 7 and 8 show an actual engine constructed in accordance with these principles and the engine is identified generally by the reference numeral 29. Those components of the engine which are the same as those schematically shown in FIGS. 3 and 5 have been identified by the same reference numerals used therein.

As may be seen in this more detailed view, the engine 29 includes a cylinder block 31 in which the bore 23 is formed by a pressed in or otherwise inserted liner 32. The piston 22 is connected to a crankshaft 33 that is journaled in a crankcase chamber 34 by means of a connecting rod 35 in a known manner.

A fresh air charge is inducted into the crankcase chamber 34 during the upward movement of the piston 22 through an inlet passageway 36 in which a reed-type check valve 37 is positioned for precluding reverse flow.

The air charge which is compressed within the crankcase chamber 34 is transferred to the main chamber 21 during the downward movement of the piston 22 through a plurality of scavenge or transfer passages 38.

As aforenoted, the combustion begins at approximately the time when fuel injection from the nozzle 27 into the subchamber 25 begins. If desired, a glow plug 39 may be positioned in the subchamber 25 to assist in starting and cold running. In addition, a decompression device 41 may be further incorporated so as to facilitate starting.

After combustion has begun, the combustion and expansion has occurred, the exhaust gases are discharged through an exhaust port 42 that is uncovered during the descent of the piston 22.

It should be noted in the physical embodiment as shown in FIGS. 7 and 8 that the communicating passageway 26 does not extend in a completely axial directon but rather is offset at an angle as shown in FIG. 9. In addition, the passageway 26 may have an unequal flow area with the reduced throat $A_1$ being formed at the area where the passageway enters the subchamber 25. The discharge end 43 may be angularly disposed and will have a slightly greater cross-sectional area. However, the effective flow area is that of the smallest diameter area $A_1$.

In the embodiments of the invention as thus far described, the throat area has been defined by a generally axially extending cylindrical projection of the opening of the communication passageway into the cylinder bore. However, it is possible to achieve the timing of the fuel injection and the flow relationships between the area $A_2$ and $A_1$ by forming a projection 51 on the head of the piston 22 as shown in the embodiment of FIG. 10. In this condition, the flow area $a_2$ will be a conical section as shown in this figure. The same principles, however, apply. That is, the fuel injection is not commenced until the area $a_2$ is approximately equal to the area $A_1$.

It should be readily apparent from the foregoing description that the embodiments of the invention are particularly adapted to insure maximum air utilization with a diesel engine having a subchamber. Although several embodiments of the invention have been illustrated and described, various changes and modifications may be made without departing from the spirit and scope of the invention, as defined by the appended claims.

What is claimed is:

1. A diesel engine comprising means defining a main chamber that varies cyclically in volume during engine operation and which forms a main combustion chamber, a subchamber having a volume substantially smaller than the maximum volume of said main chamber, said subchamber communicating with said main chamber through a communication passageway, the varying of the volume of said main chamber effecting at times a flow through said communication passageway from said main chamber into said subchamber through a throat area that varies in size during the cyclic operation of said engine, fuel injection means for injecting fuel into said subchamber to initiate and maintain combustion, and means for effecting the beginning of fuel injection from said fuel injection means at a time when the effective area of said throat decreases to an area that is substantially equal to the effective flow area of said communication passageway.

2. A diesel engine as set forth in claim 1 wherein the engine is a reciprocating engine and the main chamber is formed in part by a cylinder head, a cylinder bore and a piston.

3. A diesel engine as set forth in claim 2 wherein the subchamber is formed in the cylinder head.

4. A diesel engine as set forth in claim 3 wherein the throat area is defined by a projection of the area where the communication passageway intersects the main chamber and the head of the piston.

5. A diesel engine as set forth in claim 4 wherein the head of the piston is configured so as to achieve the effective relationship at which injection is commenced.

6. A diesel engine as set forth in claim 1 wherein the engine operates on the two-stroke principle.

7. A diesel engine as set forth in claim 6 wherein the engine is a reciprocating engine and the main chamber is formed in part by a cylinder head, a cylinder bore and a piston.

8. A diesel engine as set forth in claim 7 wherein the subchamber is formed in the cylinder head.

9. A diesel engine as set forth in claim 8 wherein the throat area is defined by a projection of the area where the communication passageway intersects the main chamber and the head of the piston.

10. A diesel engine as set forth in claim 9 wherein the head of the piston is configured so as to achieve the effective relationship at which injection is commenced.

11. The method of operating a diesel engine having a main chamber that varies cyclically in volume during engine operation, a subchamber having a volume substantially smaller than the maximum of the main chamber and a communicating passageway through which the subchamber communicates with the main chamber, said method comprising the steps of varying the throat area through which the main chamber communicates with the communication passageway cyclically during the operation of the engine, and injecting fuel into the subchamber to initiate combustion when the effective cross-sectional area of the throat is approximately equal to the effective flow area of the communication passageway.

12. The method as set forth in claim 11 wherein the engine operates on the two-stroke cycle.

13. The method as set forth in claim 11 wherein the engine is a reciprocating engine.

14. The method as set forth in claim 13 wherein the reciprocating engine operates on the two stroke, crankcase compression principle.

* * * * *